(12) United States Patent
Pontbriand

(10) Patent No.: US 12,479,255 B1
(45) Date of Patent: Nov. 25, 2025

(54) AXLE DEPLOYMENT SYSTEM FOR USE WITH A TOWABLE VEHICLE

(71) Applicant: Marcel Pontbriand, Pahrump, NV (US)

(72) Inventor: Marcel Pontbriand, Pahrump, NV (US)

( * ) Notice: Subject to any disclaimer, the term of this patent is extended or adjusted under 35 U.S.C. 154(b) by 0 days.

(21) Appl. No.: 19/086,753

(22) Filed: Mar. 21, 2025

Related U.S. Application Data

(60) Provisional application No. 63/698,715, filed on Sep. 25, 2024.

(51) Int. Cl.
| | | |
|---|---|---|
| *B60G 17/015* | (2006.01) | |
| *B60G 17/016* | (2006.01) | |
| *B62D 61/12* | (2006.01) | |

(52) U.S. Cl.
CPC ....... *B60G 17/0155* (2013.01); *B60G 17/016* (2013.01); *B62D 61/12* (2013.01); *B60G 2202/412* (2013.01); *B60G 2204/45* (2013.01); *B60G 2204/47* (2013.01); *B60G 2300/04* (2013.01); *B60G 2400/972* (2013.01); *B60G 2500/324* (2013.01); *B60G 2800/016* (2013.01)

(58) Field of Classification Search
CPC ... B60G 17/0155; B60G 17/016; B62D 61/12
See application file for complete search history.

(56) References Cited

U.S. PATENT DOCUMENTS

| | | |
|---|---|---|
| 3,743,315 A | 7/1973 | Bilas |
| 3,771,812 A | 11/1973 | Pierce et al. |
| 4,383,696 A | 5/1983 | Picard |
| 4,573,704 A | 3/1986 | Vandenberg et al. |
| 5,549,322 A | 8/1996 | Hauri |
| 6,923,452 B1 | 8/2005 | Zachmeier et al. |
| 8,500,167 B2 | 8/2013 | Diaz |
| 8,892,307 B2 | 11/2014 | Fazzalari et al. |
| 8,935,054 B2 | 1/2015 | Mantini et al. |

(Continued)

FOREIGN PATENT DOCUMENTS

| | | | | |
|---|---|---|---|---|
| DE | 20317350 U1 | * | 3/2004 | ........... B62D 61/125 |
| DE | 10162227 | | 11/2005 | |

(Continued)

OTHER PUBLICATIONS

T. Keles, L. Güvenç, and E. Altu,Ecu controlled intelligent lift axle dropping and lifting system for heavy trucks, Engineering Science and Technology, an International Journal 22 (2019) 885-893.

(Continued)

*Primary Examiner* — Faye M Fleming
(74) *Attorney, Agent, or Firm* — Clark Hill PLC; James R. Foley

(57) ABSTRACT

A lift axle system which selectively lowers (and raises) an axle. When wheels of the lift axle system are lowered to the ground, the wheels effectively work to reduce the load supported by the original axles. A percentage of the weight of the rear of the towable vehicle is transferred to the attachment point to its tractor, that is, to the front of the towable vehicle. This helps to better balance the load, making the vehicle more stable on the road. The lift axle system is easy to operate and extends the life of the base system.

18 Claims, 12 Drawing Sheets

(56) References Cited

U.S. PATENT DOCUMENTS

| | | |
|---|---|---|
| 10,099,529 B2 | 10/2018 | Youngers et al. |
| 10,960,946 B2 | 3/2021 | Smith |
| 11,833,713 B2 * | 12/2023 | Datema .................. G01F 23/22 |
| 11,872,852 B2 * | 1/2024 | Henry ............... B60C 23/00354 |
| 2020/0207171 A1 | 7/2020 | Bosschieter et al. |

FOREIGN PATENT DOCUMENTS

| | | | |
|---|---|---|---|
| DE | 102008032104 | 1/2010 | |
| EP | 0332037 | 9/1991 | |
| WO | WO-2023280780 A1 * | 1/2023 | ............. B60G 11/27 |

OTHER PUBLICATIONS

Drop Down Suspension: a Moving Experience, Timbren, 2022, https://timbren.com/.

Composilite EXS20, Hendrickson USA, L.L.C., 2022, https://www.hendrickson-intl.com/.

International Search Report and Written Opinion for PCT/US25/27711 mailed Jul. 2, 2025.

* cited by examiner

AXLE DEPLOYMENT SYSTEM FOR USE WITH A TOWABLE VEHICLE

RELATED APPLICATION (PRIORITY CLAIM)

This application claims the benefit of U.S. Provisional Application Ser. No. 63/698,715, filed on Sep. 25, 2024, which is hereby incorporated herein by reference.

BACKGROUND

The present invention generally relates to lift axle systems, and more specifically relates to lift axle system for use with a towable vehicle such as, for example, a fifth wheel recreational vehicle (RV).

A fifth wheel RV is a type of recreational vehicle that is towed by a pickup truck. Fifth wheel RVs are typically larger and offer more living space compared to traditional travel trailers. They often feature multiple slide-outs to increase interior space when parked, as well as amenities such as full-sized kitchens, bathrooms, bedrooms, and living areas. As a result, fifth wheel RVs are popular among RV enthusiasts who prefer a spacious and comfortable living space while traveling or camping.

Fifth wheel RVs are towed using a special hitch mounted in the bed of the pickup truck. The hitch consists of a kingpin on the RV that connects to a horseshoe-shaped hitch receiver in the truck bed, providing a stable and secure connection between the truck and the RV. The design of a fifth wheel RV allows for better weight distribution, improved towing stability, and easier maneuverability compared to other types of RVs.

RV manufacturers mainly sell vehicles with two axles. When the vehicle (either travel trailer or fifth wheel RV) is thirty-seven feet or longer and/or if the distance between its rear factory rear axle and back bumper is too large, it usually is unstable while being driven on the road. The vehicle tends to fishtail, get untracked by wind or by driver maneuvers, and bounces all over, which can also cause objects to fall within in the RV (i.e., objects such as screws, moldings, etc.).

SUMMARY

An object of an embodiment of the present invention is to provide a lift axle system which is configured to reduce or eliminate the fishtailing of a towable vehicle.

Briefly, an embodiment of the present invention provides a lift axle system which is configured for mounting to a towable vehicle. The lift axle system comprises an axle and an axle deployment system which is configured to selectively deploy the axle to stabilize the towable vehicle during towing. Preferably, the axle deployment system is configured to use air to lower the axle. When the axle lowers, wheels on the axle touch the ground and effectively reduce the load supported by the original axles of the towable vehicle. A percentage of the weight of the rear of the towable vehicle is effectively transferred to the attachment point to towable vehicle. This helps to better balance the load, making the towable vehicle more stable on the road. The lift axle system is easy to operate and extends the life of the towable vehicle.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
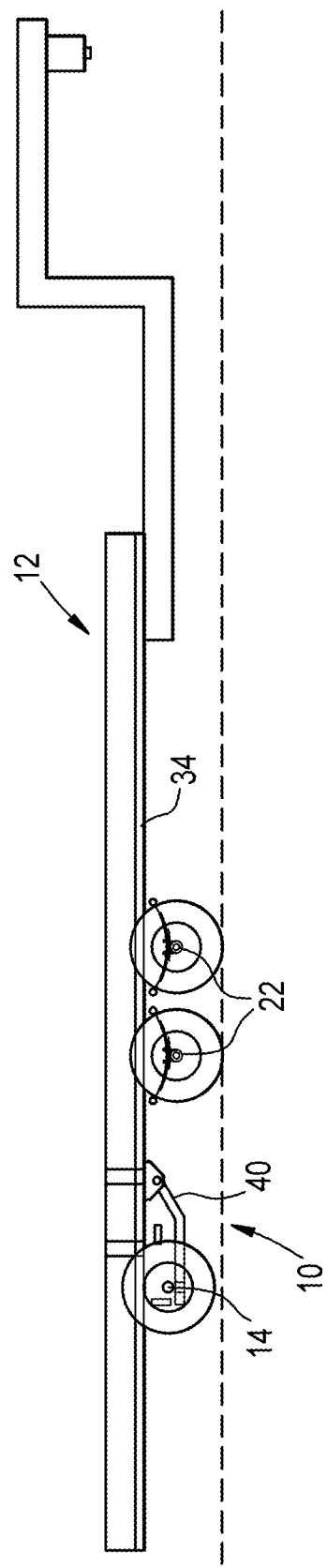
FIG. 1 is a side view showing an axle lift system mounted to the frame of a towable vehicle, such as a fifth wheel RV, where the axle lift system is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention and is not intended to limit the invention to that as illustrated.

Figure 2:
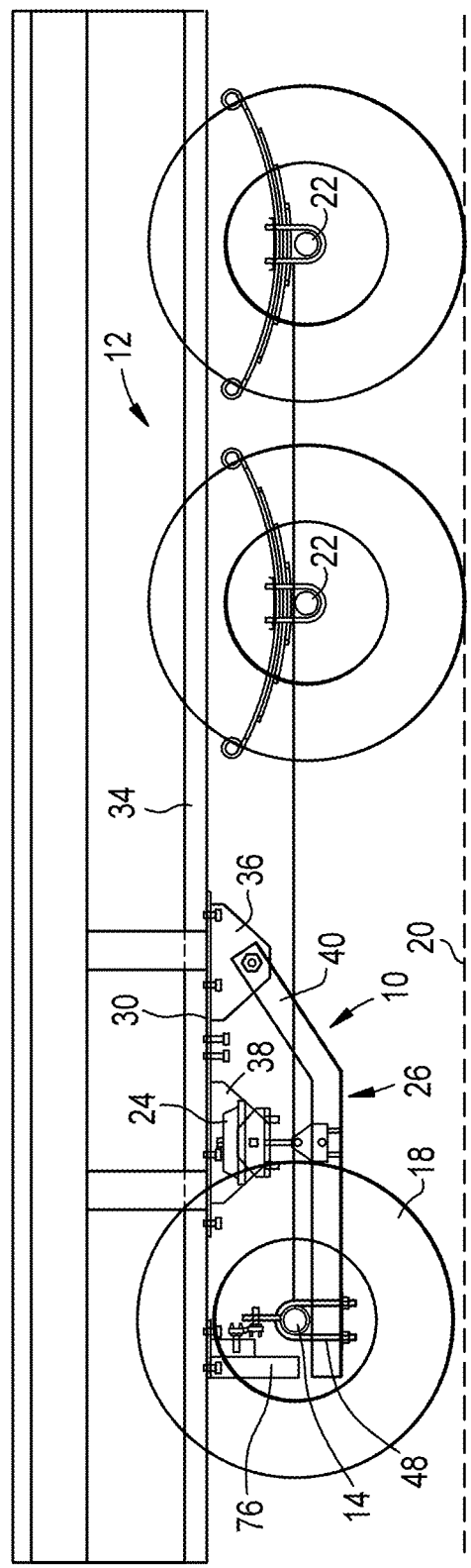
FIG. 2 is similar to FIG. 1 but provides a closer view of the axle lift system, and also shows the axle in the raised position.
Figure 3:
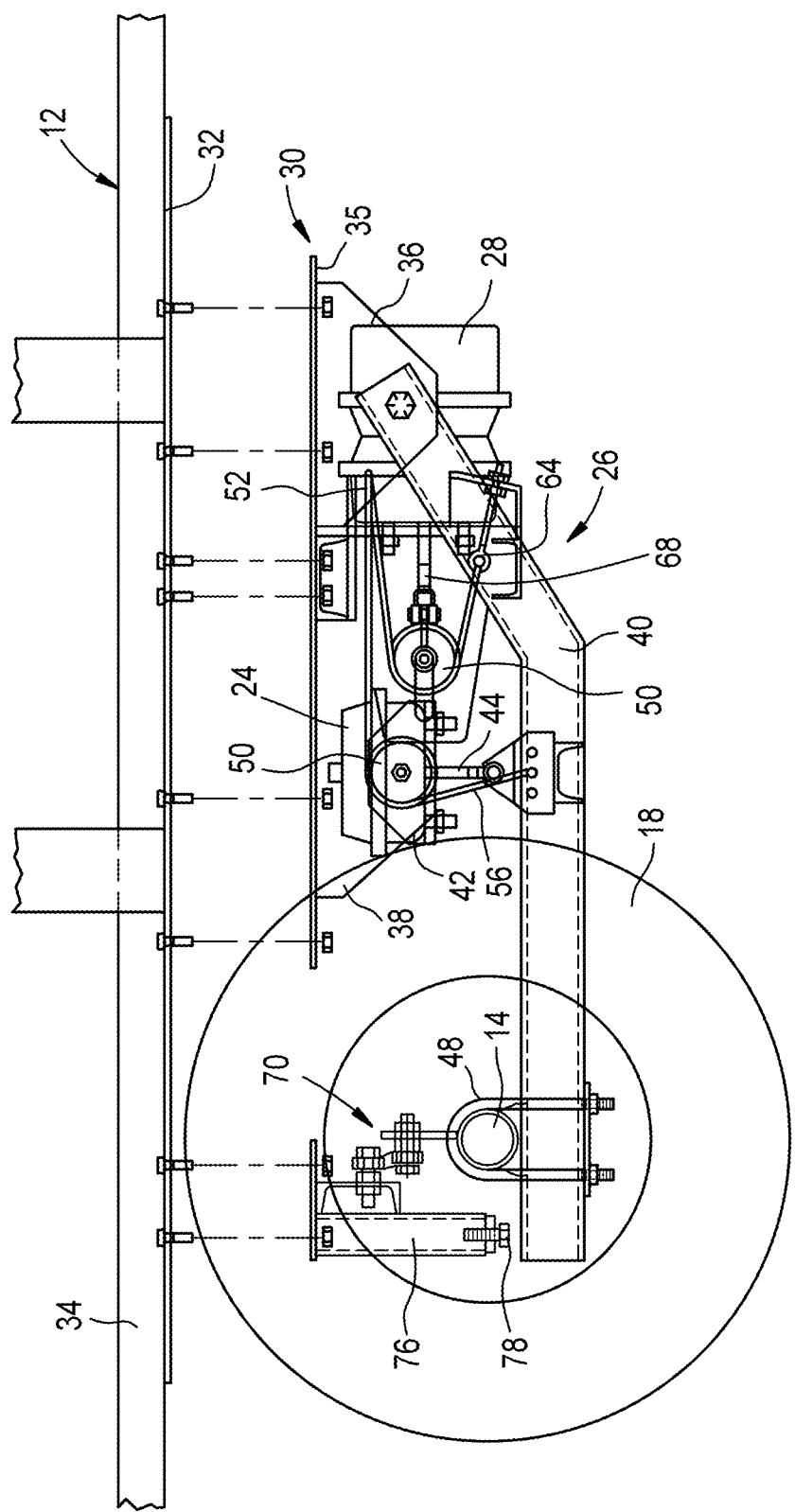
FIG. 3 shows some of the components of the axle lift system in more detail, and shows how the system mounts to the towable vehicle.

An embodiment of the present invention comprises a lift axle system 10 for use with a towable vehicle 12, such as a fifth wheel RV. As shown in FIGS. 1-3, the lift axle system 10 comprises an axle 14 and an axle deployment system 16 (see FIG. 5) which is configured to selectively deploy the axle 14 to stabilize the towable vehicle 12 during towing. Preferably, the axle deployment system 16 is configured to use air to lower the axle 14. Regardless of what means is used to lower the axle 14, when the axle 14 lowers, wheels 18 on the axle 14 touch the ground 20 (see FIG. 12) and effectively reduce the load supported by the original axles 22 of the towable vehicle 12. A percentage of the weight of the rear of the towable vehicle 12 is effectively transferred to the attachment point to towable vehicle 12. This helps to better balance the load, making the towable vehicle 12 more stable on the road 20. The lift axle system 10 is easy to operate and extends the life of the towable vehicle 12.

Figure 9:
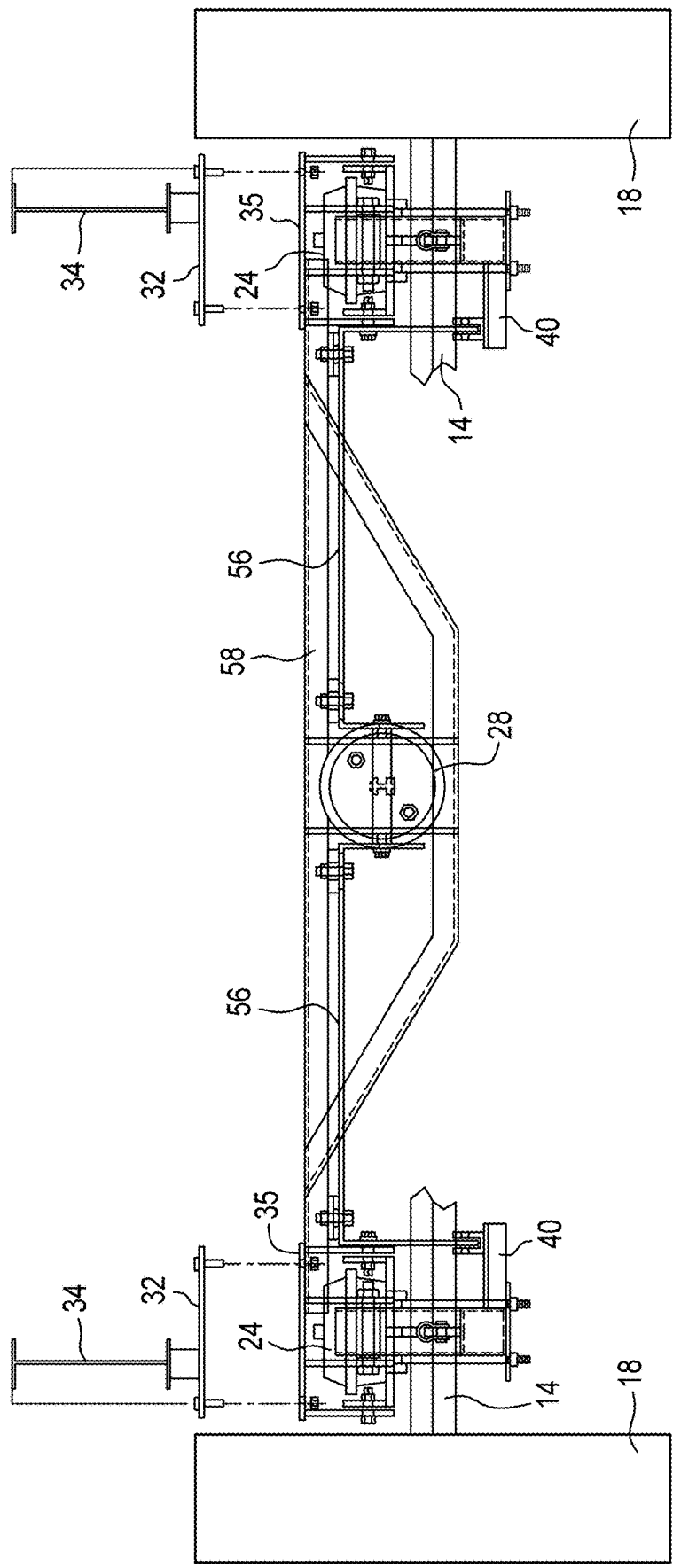
FIG. 9 is a front view of the lift axle system.
Figure 10:
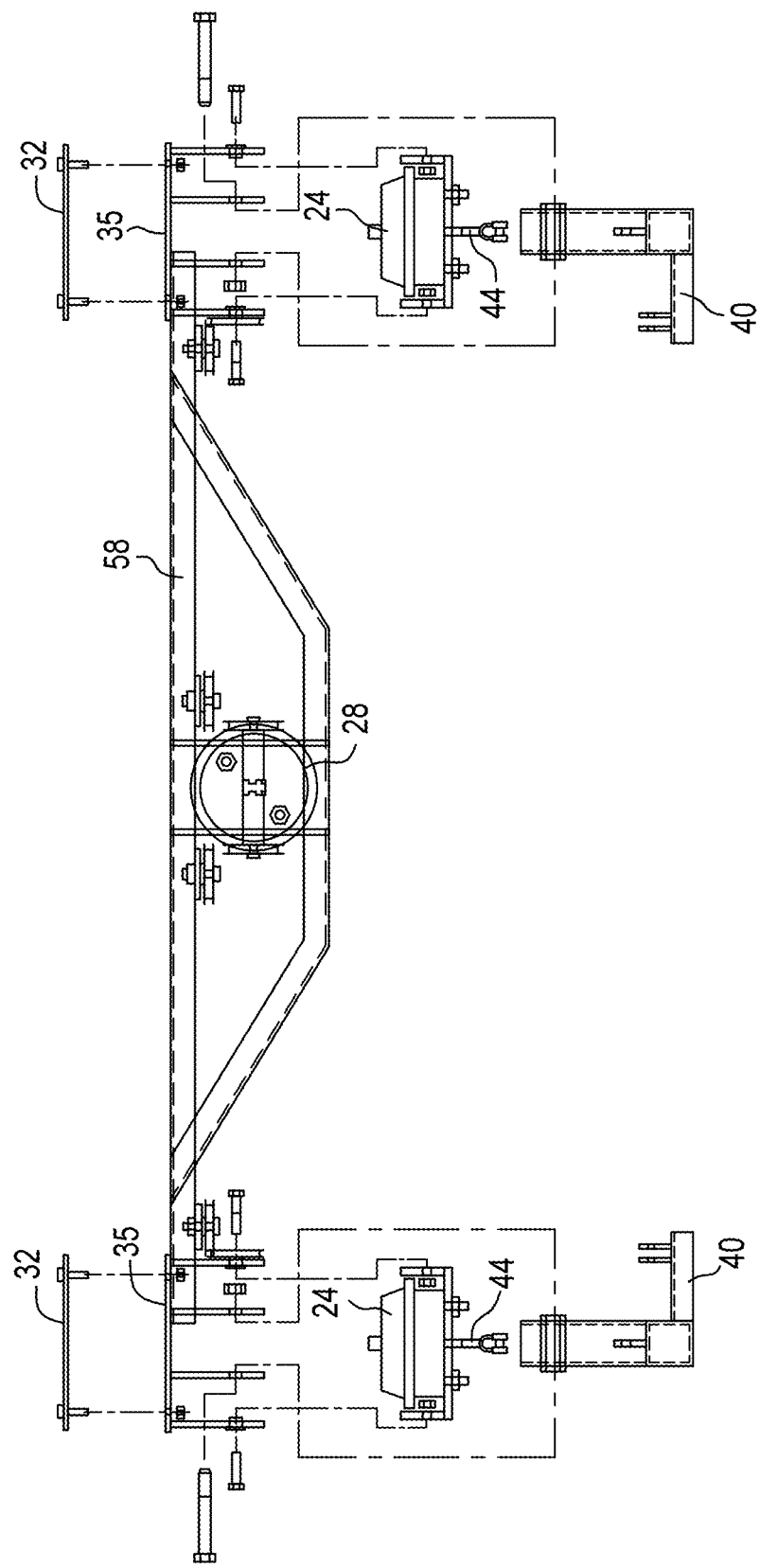
FIG. 10 is similar to FIG. 9 but shows some components exploded away for clarity.
Figure 11:
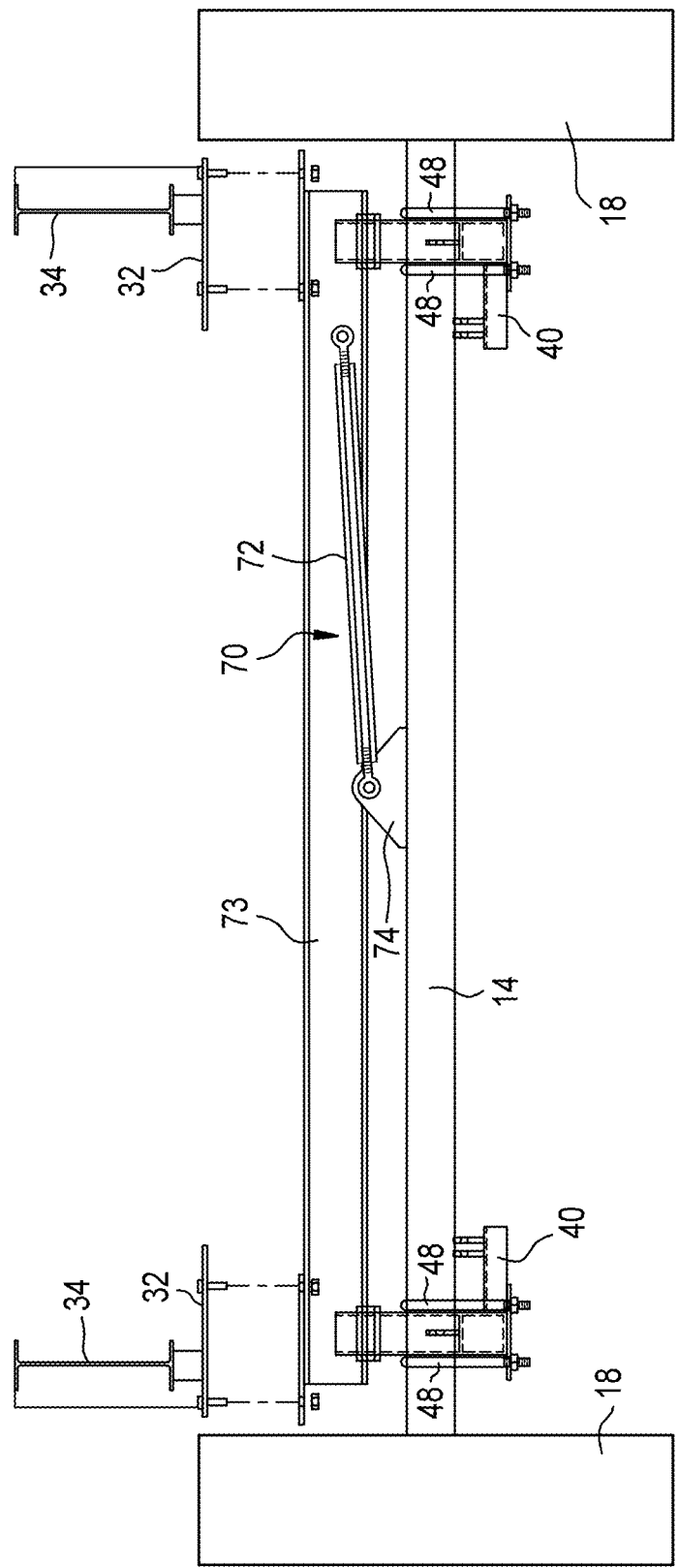
FIG. 11 shows the stabilization system of the axle lift system.
Figure 12:
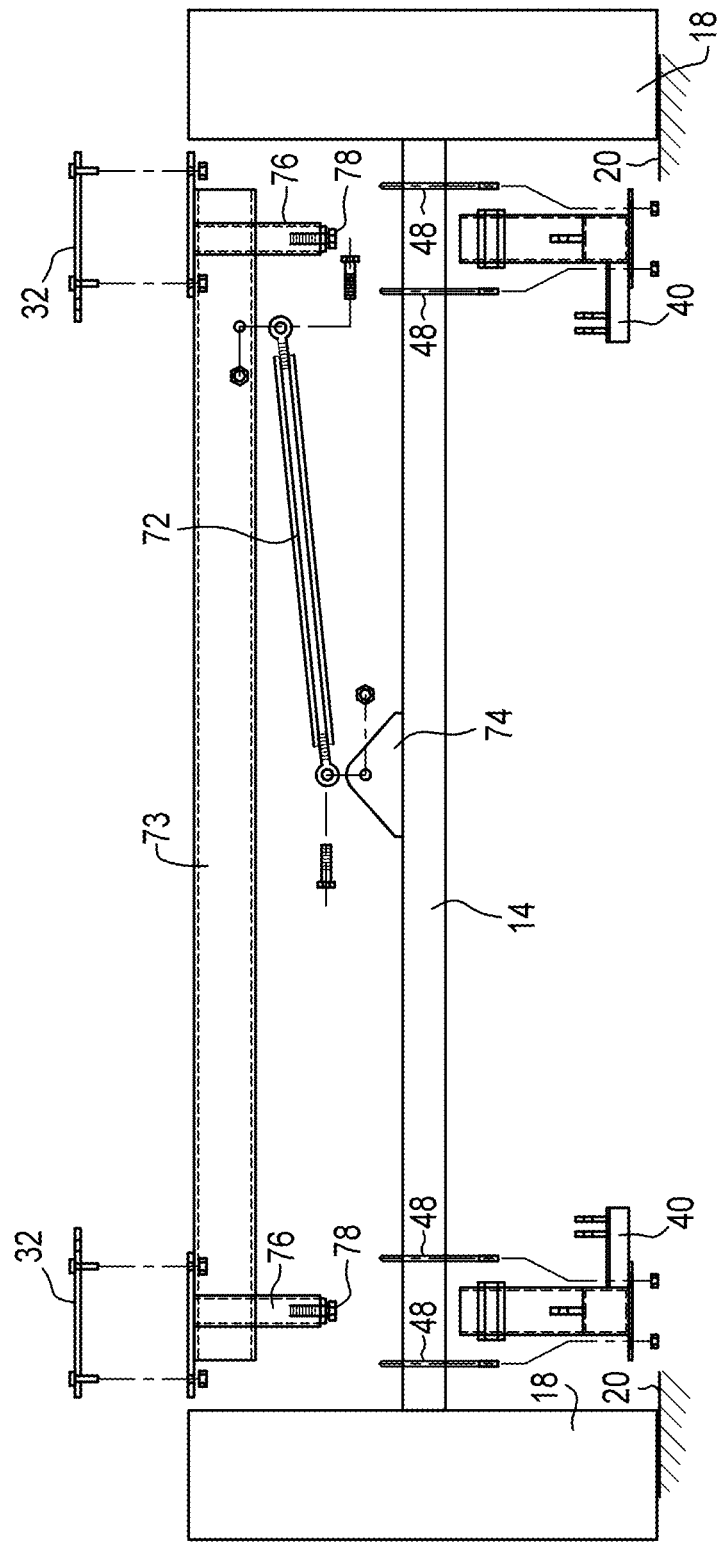
FIG. 12 shows the axle lift system in a state with the axle in the lowered position.

The additional axle 14 is effectively mounted to the towable vehicle 12. As shown in FIGS. 9, 11 and 12, the additional axle 14 has a wheel 18 on each end of the axle 14. The axle 14 can be selectively raised (as shown in FIG. 2) and lowered (as shown in FIG. 12) such that the wheels 18 on the axle 14 lift off the ground 20 when the axle 14 is lifted and are pushed into contact with to the ground 20 when the axle 14 is lowered.

When the wheels 18 of the lift axle system 10 are lowered as shown in FIG. 12, the wheels 18 help to reduce the load supported by the original axles 22 (see FIGS. 1 and 2). A percentage of the weight of the rear of the towable vehicle 12 is transferred to the attachment point to its tractor, that is, to the front of the towable vehicle 12. This helps to better balance the load, making the vehicle 12 more stable on the road 20. This also solves another problem. Generally, the original axle(s) 22 of standard-duty towable vehicles operate at their maximum capacity relative to the weight of the towable vehicle 12. Consequently, depending on the use of the towable vehicle 12, the original axles 22 and suspension system are heavily stressed, which can lead to premature wear of the components. The lift axle system 10 therefore helps to extend the life of the base system.

Figure 4:
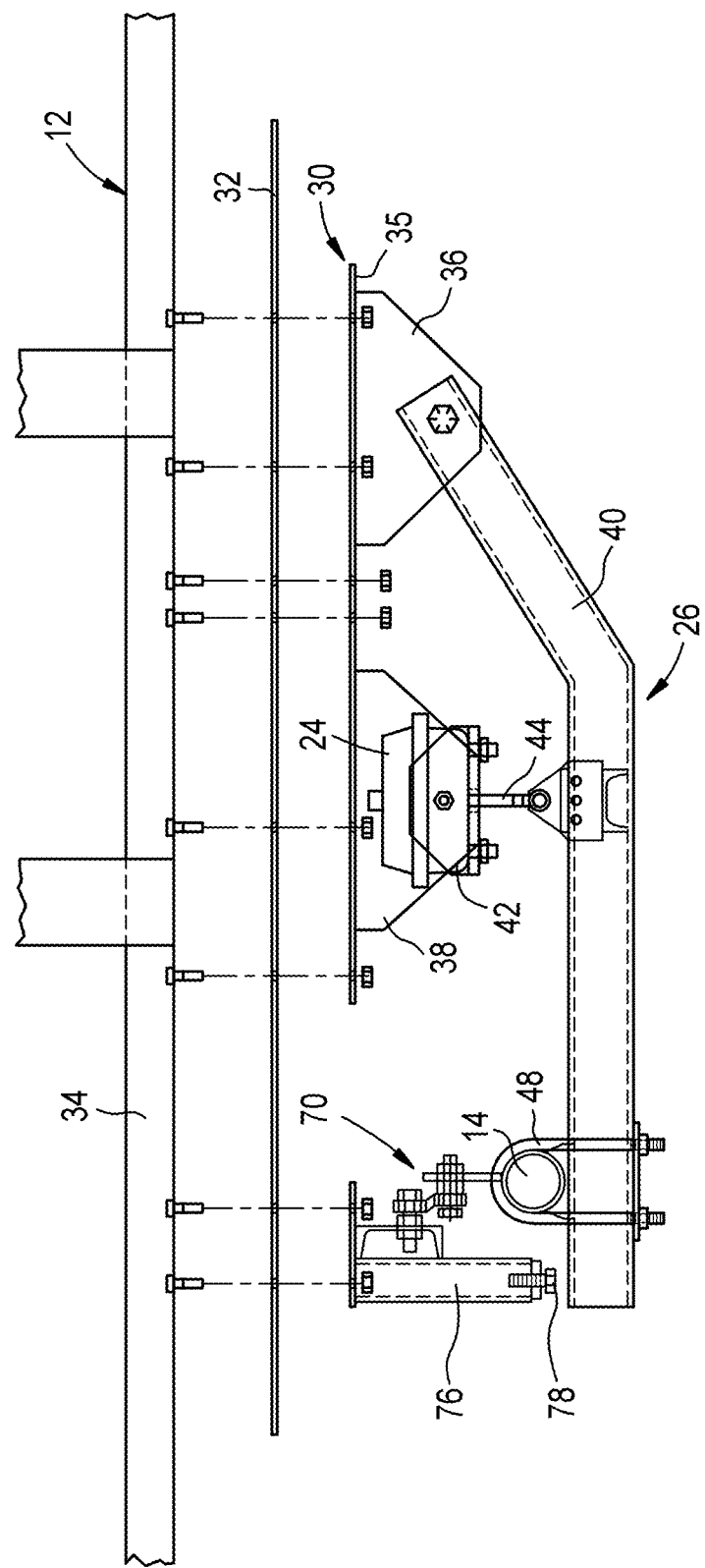
FIG. 4 is similar to FIG. 3 but, for clarity, omits some components of the axle lift system.
Figure 5:
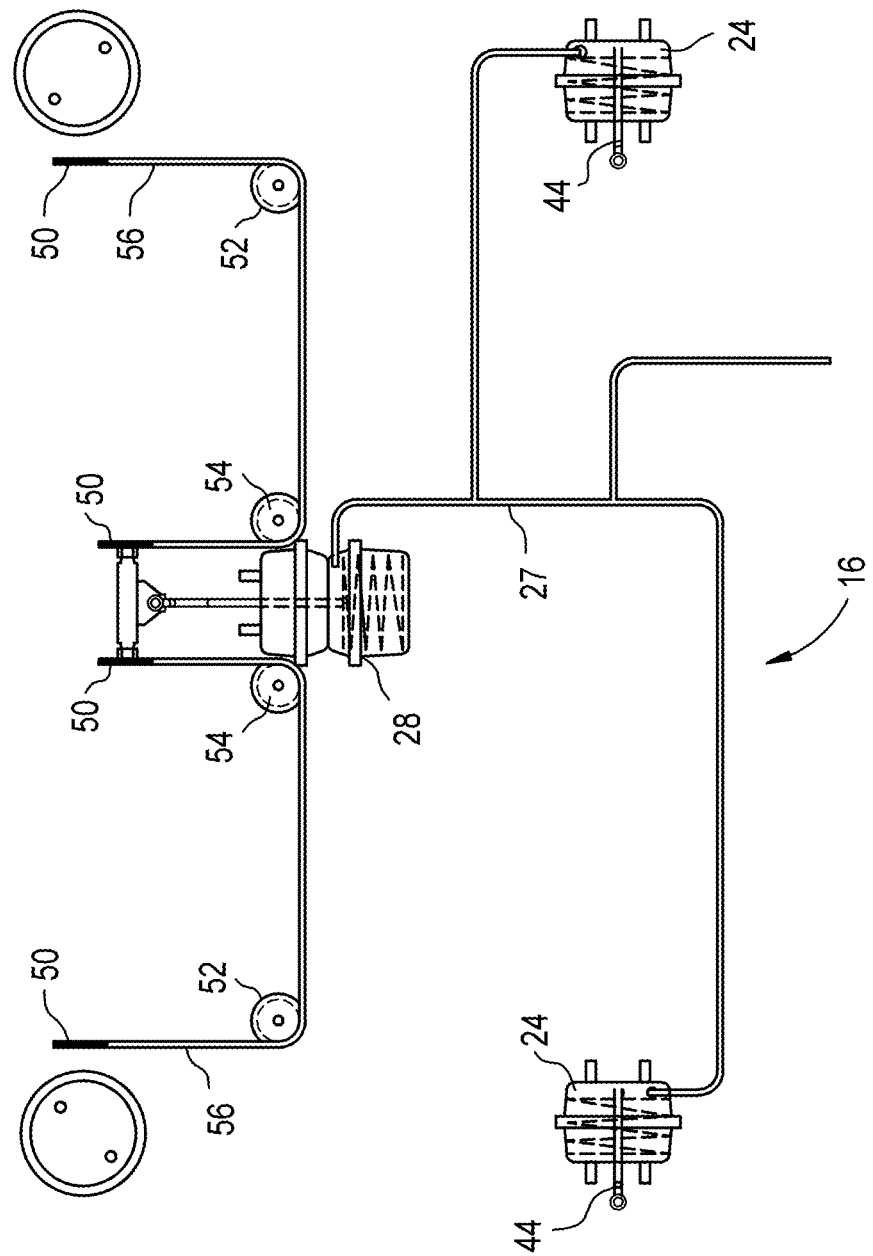
FIG. 5 is a schematic diagram which shows a double air booster connected to the air booster of the each of the two modules of the axle lift system.

Preferably, the lift axle system 10 includes an axle deployment system 16 which is configured to lift and lower the axle 14 using air boosters 24 (see FIGS. 2-5 and 7-10). Preferably, there is a module 26 for each wheel 18 wherein each module 26 comprises a single air booster 24 and each air booster 24 is connected (via air hoses 27) to a double air booster 28, as shown in FIG. 5. In use, the double air booster 28 releases its pressure, and the air boosters 24 of the modules 26 push down the arms 40 to lower the axle 14 such that the wheels 18 drop to the ground 20, as shown in FIG. 12.

The structure of a preferred embodiment of the lift axle system 10 and how each module 26 preferably connects to an RV will now be described. FIGS. 2-4 show one of the modules 26 proximate an end of the axle 14 (the module proximate the other end of the axle would be much the same) and how it mounts to the vehicle 12. As shown, each module 26 preferably comprises a base assembly 30 that gets bolted to a plate 32 which is preferably welded to the towable vehicle 12 (such as to an I-beam 34 of the frame of the towable vehicle 12). The plate 32 is adjustable regarding the exact location it is installed thereby providing flexibility regarding the exact point of installation.

Figure 6:
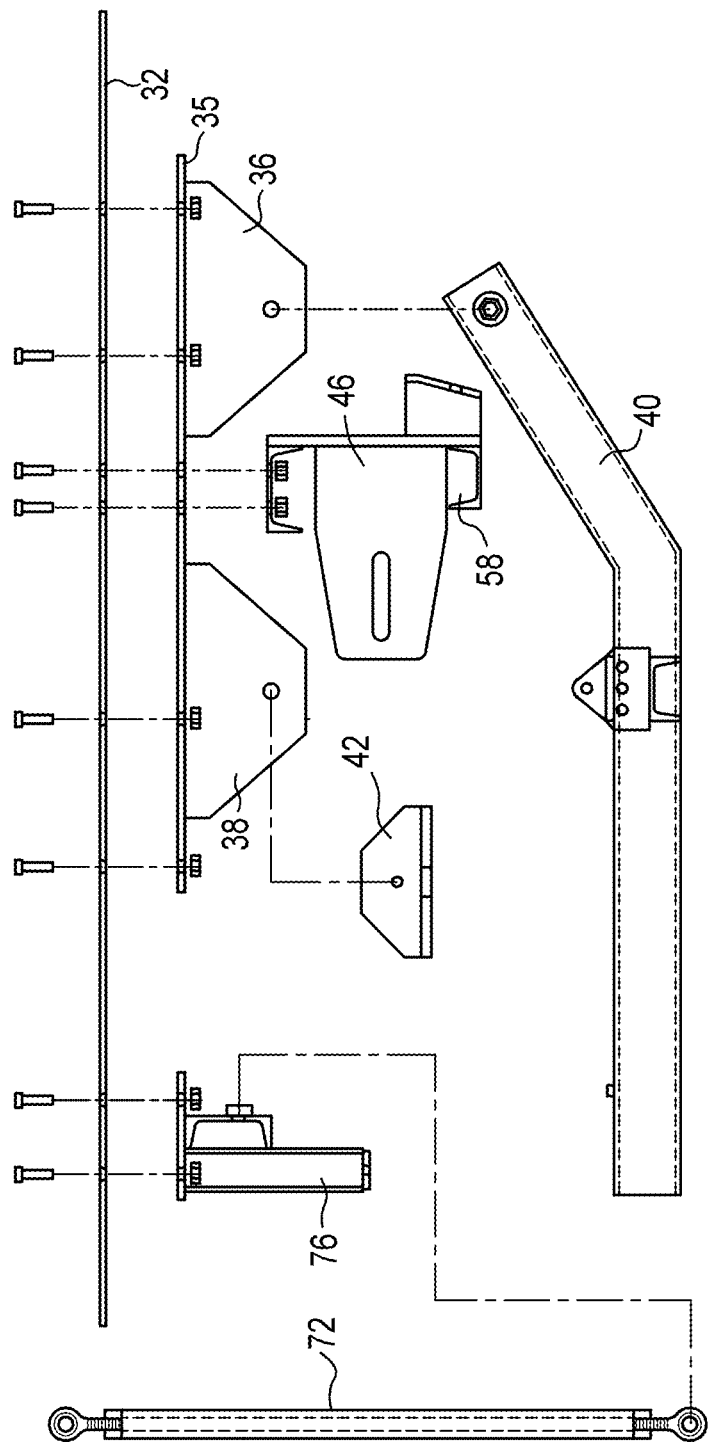
FIG. 6 shows some of the components of the axle lift system where the components, for clarity, are disconnected from each.
Figure 7:
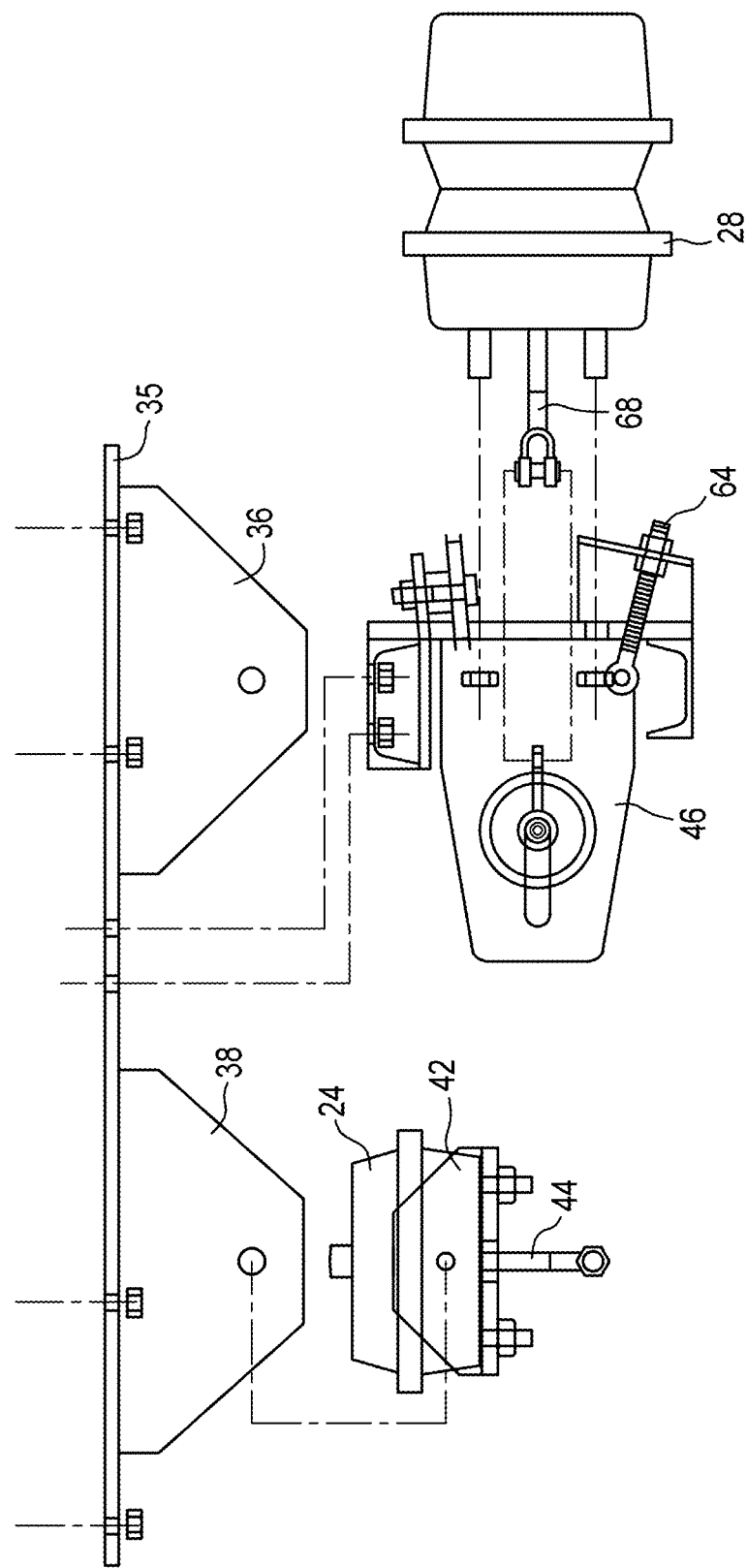
FIG. 7 shows some of the components of the system, including an air booster and a mounting bracket.

The base assembly 30 effectively reinforces and defines the installation location of the lift axle system 10. As shown most clearly in FIGS. 4, 6 and 7, preferably the base assembly 30 comprises a plate 35 to which is welded four brackets 36, 38. An arm 40 is bolted to the two brackets 36 and an air booster 24 is mounted vertically (via bracket 42) and coupled to the two brackets 38. A threaded rod 44 of the air booster 24 is fixed to the arm 40. Therefore, when the air booster 24 is activated, it pushes on the arm 40. There is a module 26 proximate each end of the axle 14 (see FIGS. 8, 9, 11 and 12), and the air boosters 24 effectively work in unison. The double air booster 28 is preferably attached using a bracket 46 (see, for example, FIG. 6) which also attaches to plate 32.

The additional axle 14 mounted with two wheels 18 (see FIGS. 9, 11 and 12) is attached on each side to the two arms 40 (via two u-bolts 48), and the pressure exerted by the single air boosters 24 on the arms 40 keeps the wheels 18 against the ground. This is the process of the axle deployment system 16 lowering the axle 14. When under pressure such that the wheels 18 are on the ground (see FIG. 12), the height of the arm 40 will vary following the ground's oscillation. When the towable vehicle 12 is on level terrain, the arm 40 is preferably about halfway through its possible range, both in the high and low positions.

Figure 8:
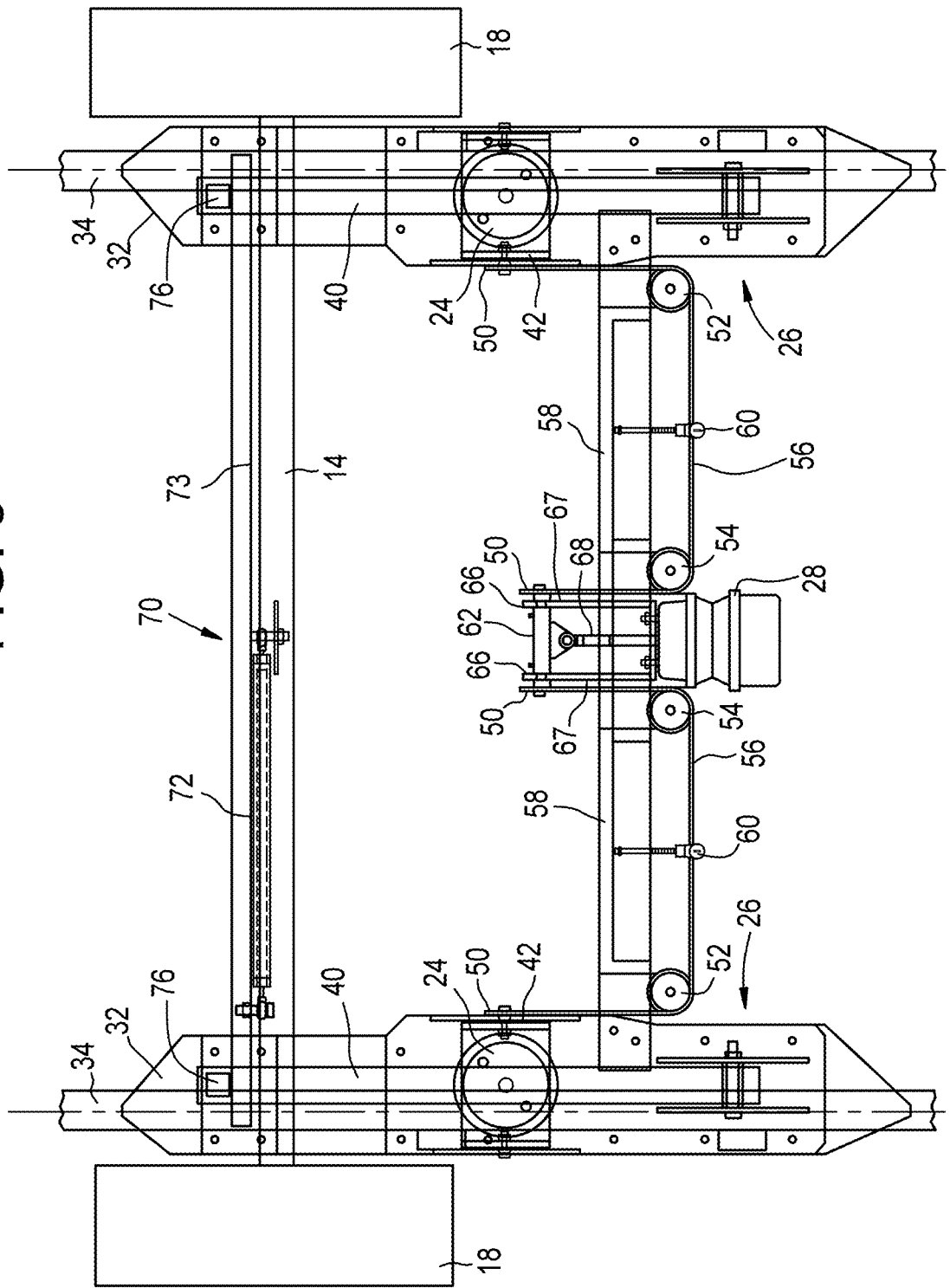
FIG. 8 is a top view of the lift axle system.

As shown in FIG. 8, each module 26 also includes pulleys 50, 52, 54 and a steel cable 56. As shown in FIGS. 6, 8, 9 and 10, the lift axle system 10 also includes a support, such as in the form of a cross-member 58. As shown in FIG. 5, given that there is a module 26 proximate each end of the axle 14, two pulley paths are provided wherein one steel cable 56 is installed in each pulley path. As shown in FIGS. 3 and 8 collectively, each steel cable 56 begins its route fixed to each arm 40, passing through a vertical pulley 50, a horizontal pulley 52, an intermediate steel cable tensioner 60 (see FIG. 8), an oblique direction-changing pulley 54, reaching another pulley 50 mounted on a movable support 62 and ending its route at a steel cable tensioner 64 coupled to the cross-member 58 opposite to the pulley 50 of the movable support 62. It should be noted that, as shown in FIG. 8, the movable support 62 is installed in a slot 66 in a support 67 on each side where it is allowed to move forward or backward, as needed. As shown in FIG. 8, it is also coupled to the threaded rod 68 of the double air booster 28, which is installed horizontally, with the threaded rod 68 pointing toward the back of the tractable vehicle 12. When no air pressure is in the system, double air booster threaded rod 68 pushes on the movable support 62, simultaneously pulling on each steel cable 56 (see FIG. 5). Therefore, pulling on each arm 40, raising the axle 14 to its highest position as shown in FIG. 2. This is the process of the axle deployment system 16 raising the axle 14.

Preferably, as shown in FIG. 11, the lift axle system 10 preferably also includes a stabilizing system 70 is configured to mitigating lateral movements of the towable vehicle 12 when it is in motion on the road 20. Preferably, the stabilizing system 70 comprises a traction bar 72 that connects via a cross-member 73 that is attached on each side of each plate 32 (as shown in FIG. 8). The traction bar 72 is fixed on one end to the cross-member 73 and on the other end to the additional axle 14 (via a bracket 74 welded to the axle 14). The traction bar 72 also acts as a stabilizer arm, mitigating the lateral movements of the towable vehicle 12 when it is in motion on the road 20. The cross-member 73 is also equipped with two stoppers 76 to limit the maximum height of the arms 40 when the axle 14 is kept in the raised position as shown in FIG. 12.

As described, the lift axle system 10 preferably comprises two weldable base plates 32, one under each vehicle frame beam 34. Preferably, an assembly module 26 is coupled to each base plate 32, and each assembly module 26 comprises a single air booster 24, pulleys 50, 52, 54, a pivoting arm 40, wherein when under pressure on the ground 20, will vary in height following the ground's oscillation. When the system 10 is active on level terrain, the pivoting arm 40 is about halfway through its possible range, both in the high and low positions. The pivoting arm 40 of each assembly module 26 connects to an axle 14. Preferably, each assembly module 26 comprises a plurality of pulleys 50, 52, 54 and a steel cable 56 that engages the pulleys 50, 52, 54. A movable support 62 is preferably coupled to the threaded rod 68 of a double air booster 28 and the double air booster 28 is preferably mounted proximate the center of a cross-member 58. Preferably, each assembly module 26 comprises two steel cable tensioners 60, 64 and a stopper 76 to restrict how far the axle 14 can be raised. Preferably, a base plate 32 is welded under each I-beam 34 of the vehicle's chassis, to allow optimal installation of the lift axle system 10. The plates 32 (i.e., one on each side) are adjustable to determine the appropriate position of the assembly modules 26.

The assembly module 26 is positioned and coupled under each base plate 32, and the mount for a single air booster 24 is coupled to a predefined attachment point on each assembly module 26. The mount for the single air booster 24 is installed halfway between the attachment point of the arm 40 and the attachment point of the axle 14. The mount for the single air booster 24 also includes the assembly of a pulley, which is part of the steel cable path used in the process of raising the axle 14.

Each single air booster 24 is coupled to its mount. The single air booster 24 serves to push the arm 40 downwards. The single air booster 24 is positioned from top to bottom so that the pressure it exerts pushes vertically. The operation of the single air booster 24 is adjustable by adjusting the length of the threaded rod 44.

The mount for a pivoting arm 40 is coupled to a predefined attachment point on the assembly module 26. As shown in FIG. 2, the pivoting arm 40 is pivotally coupled to bracket 36 with the attachment point located at the front end of the pivoting arm 40. The pivoting arm 40 includes an attachment point halfway between the front attachment point of the arm 40 at the arm mount (bracket 36) and an attachment point of the axle 14. This attachment point is for coupling with the single air booster 24. As shown in FIG. 3, near the attachment point, there is also an attachment point for a steel cable 56 used in the process of raising the axle 14. The rear end of the pivoting arm 40 serves as a point of contact for a stopper 76 to limit its upward pivoting movement.

There is a cross-member 58 comprising pulleys 50, 52, 54, steel cable tensioners 60, 64, a movable support 62, and a double air booster 28, is coupled on each side to the assembly modules 26. Four pulleys are coupled to the cross-member 58, two per side. As shown in FIG. 3, the two pulleys installed at the ends of the cross-member 58 are installed parallel to the assembly modules 26. The two pulleys installed at the center of the cross-member 58, on each side of the double air booster, are installed obliquely.

As shown in FIGS. 5, 8 and 9, there are two steel cables 56, one on each side, wherein each steel cable 56 connects to an arm 40, then runs over a pulley perpendicular to the cross-member 58, located close to the single air booster 24, inside the mounting bracket of the single air booster 24. Then a first upper pulley, installed horizontally. This is followed by a tensioner 60 to maintain minimum steel cable tension. Then a second pulley, installed obliquely, near the double air booster 28 towards the center of the cross-member 58.

A tensioner 60 is installed on each side of the cross-member 58, centrally between the horizontal and oblique pulleys. The tensioner serves to maintain minimum tension in the steel wire 56 when the axle 14 is in the down position and the road surface 20 forces the axle 14 upwards despite the pressure of the single air boosters 24. Maintaining minimum tension ensures that the steel wire 56 does not come out of the groove of the pulleys.

A support 62 is located horizontally in the center, on the rear part of the cross-member 58. Each side of the support is inserted inside two grooved plates, so as to be able to move forwards or backwards according to a pressure given or removed by the double air booster 28.

The double air booster 28 is mounted in the center, on the front side of the cross-member 58. The threaded rod 68 of the double air booster 28 is coupled to the movable support 62, which gives it the power to move the support 62 forwards or backwards to the minimum or maximum position depending on the air pressure. If it receives air pressure, it compresses the high tension spring inside the double air booster 28, the threaded rod 68 moves back, giving freedom to the steel cables 56, allowing the arms 40 to lower down. If the air pressure is removed, the spring regains pressure to pull on the cables 56 which raises the axle 14.

A tensioner is installed on the cross-member 58 on each side of the double air booster 28. When there is no air pressure on the double air booster 28, the arms 40 are raised to the maximum; it is used to tension the cables 56 equally on each side, to maintain the two arms 40 in the maximum high position.

A cross-member 73 is attached to a traction bar 72 and is coupled to a predefined attachment point on the rear section of the plate 32.

The traction bar 72 is installed between the cross-member 73 and the axle 14. The traction bar 72 is adjustable depending on the length of the traction bar 72, to adjust and maintain axle parallelism with the chassis, when the axle 14 is held on the ground. An important function of the traction bar 72 is to stabilize the axle 14. It acts as a direct joint to prevent the vehicle chassis from oscillating sideways.

A stopper 76 is installed on each end of the cross-member 73, above the rear end of each arm 40, to limit the travel of the arms 40 to their maximum height. The stoppers 76 are provided with an adjustment bolt 78 to adjust the maximum height.

Preferably, the air inlet of the air lift axle is managed via the existing pneumatic system on a vehicle such as on a semi-truck, comprising an air compressor which maintains a maximum air pressure, an air tank and a control switch to engage or release the air in the lines. The air inlet of the air lift axle is managed by an installed additional pneumatic system which is autonomous and independent of the existing equipment, an electric air compressor, a pressure regulator, an air tank, an electrical control to turn the air compressor on or off, an electrical control to allow the air in or bleed the air out of the air lift axle.

In a preferred embodiment, air is allowed or purged from the system using the air switch originally installed on the vehicle's dashboard. The stock air compressor fills in and maintains maximum air pressure in an air tank also originally installed on the vehicle.

An alternative way to supply air to the air lift axle is to install:
1. A dedicated air compressor,
2. A dedicated air tank,
3. An adjustable pressure regulator,
4. An electric on/off switch to control the air compressor, mounted to the vehicle's dashboard, and
5. An air control valve, mounted to the vehicle's dashboard, to allow or disallow the air in the air lift axle system.

Regardless of which embodiment is employed, a lift axle system is provided for mounting to a towable vehicle and providing support and stabilization during towing. The lift axle system is easy to operate and extends the life of the towable vehicle.

While specific embodiments of the invention have been shown and described, it is envisioned that those skilled in the art may devise various modifications without departing from the spirit and scope of the present invention.

What is claimed is:

1. A lift axle system which is configured for mounting to a towable vehicle, said lift axle system comprising an axle and an axle deployment system which is configured to selectively deploy the axle to stabilize the towable vehicle, wherein the axle deployment system is configured to use air to lower the axle to deploy the axle, wherein the axle deployment system comprises an air booster and a pivotable arm attached to the axle and to the air booster, wherein the air booster pushes the pivotable arm to lower the axle, and wherein the axle deployment system comprises a steel cable which is configured to raise the axle when the axle is to be withdrawn, wherein the lift axle system comprises a stabilizing system configured to mitigate lateral movements of the towable vehicle when it is in motion on the road.

2. The lift axle system as recited in claim 1, wherein there is a module for each wheel, wherein each module comprises said a single air booster and each air booster is connected via air hoses to a double air booster, wherein in use, the double air booster releases its pressure, and the air boosters of the modules push down the arms to lower the axle such that the wheels drop to the ground.

3. The lift axle system as recited in claim 2, wherein each module comprises a base assembly that gets bolted to a plate which is connected to the towable vehicle.

4. The lift axle system as recited in claim 3, wherein the plate is adjustable regarding the exact location it is installed thereby providing flexibility regarding the exact point of installation.

5. The lift axle system as recited in claim 3, wherein the base assembly comprises a plate-further comprising two brackets connected to the plate, an arm which is connected to the two brackets and an air booster is mounted vertically and coupled to the two brackets, wherein a threaded rod of the air booster is fixed to the arm, wherein when the air booster is activated, it pushes on the arm.

6. The lift axle system as recited in claim 3, wherein each module also comprises pulleys and a steel cable, wherein the lift axle system also comprises a support, wherein there is a module proximate each end of the axle, wherein two pulley paths are provided wherein one steel cable is installed in each pulley path, wherein each steel cable begins its route fixed to each arm, passing through a vertical pulley, a horizontal pulley, an intermediate steel cable tensioner, an oblique direction-changing pulley, reaching another pulley mounted on a movable support and ending its route at a steel cable tensioner coupled to the cross-member opposite to the pulley of the movable support.

7. The lift axle system as recited in claim 6, wherein the movable support is installed in a slot in a support on each side where it is allowed to move forward or backward, as needed.

8. The lift axle system as recited in claim 7, wherein the movable support is also coupled to the threaded rod of the double air booster, which is installed horizontally, with the threaded rod pointing toward the back of the tractable vehicle, wherein when no air pressure is in the system, the double air booster threaded rod pushes on the movable support, simultaneously pulling on each steel cable, therefore pulling on each arm, raising the axle to its highest position.

9. The lift axle system as recited in claim 1, wherein the stabilizing system comprises a traction bar that connects via a cross-member that is attached on each side of each plate, wherein the traction bar is fixed on one end to the cross-member and on the other end to the additional axle.

10. The lift axle system as recited in claim 9, wherein the traction bar also acts as a stabilizer arm, mitigating the lateral movements of the towable vehicle when it is in motion on the road, wherein the cross-member is equipped with stoppers to limit the maximum height of the arms when the axle is kept in the raised position.

11. A lift axle system which is configured for mounting to a towable vehicle, said lift axle system comprising an axle and an axle deployment system which is configured to selectively deploy the axle to stabilize the towable vehicle, wherein the axle deployment system is configured to use air to lower the axle to deploy the axle, wherein the axle deployment system comprises an air booster and a pivotable arm attached to the axle and to the air booster, wherein the air booster pushes the pivotable arm to lower the axle, and wherein the axle deployment system comprises a steel cable which is configured to raise the axle when the axle is to be withdrawn, wherein the lift axle system comprises two base plates, one under each vehicle frame beam, wherein an assembly module is coupled to each base plate, and each assembly module comprises a single air booster, pulleys, and a pivoting arm, wherein when under pressure on the ground, will vary in height following the ground's oscillation.

12. The lift axle system as recited in claim 11, wherein when the system is active on level terrain, the pivoting arm is about halfway through its possible range, both in the high and low positions.

13. The lift axle system as recited in claim 12, wherein the pivoting arm of each assembly module connects to an axle, wherein each assembly module comprises a plurality of pulleys and a steel cable that engages the pulleys.

14. The lift axle system as recited in claim 13, wherein a movable support is coupled to the threaded rod of a double air booster and the double air booster is mounted proximate the center of a cross-member.

15. The lift axle system as recited in claim 14, wherein each assembly module comprises two steel cable tensioners and a stopper to restrict how far the axle can be raised.

16. The lift axle system as recited in claim 14, wherein a base plate is welded under each I-beam of the vehicle's chassis, to allow optimal installation of the lift axle system, wherein the plates are adjustable to determine the appropriate position of the assembly modules.

17. A lift axle system which is configured for mounting to a towable vehicle, said lift axle system comprising an axle and an axle deployment system which is configured to selectively deploy the axle to stabilize the towable vehicle, wherein the axle deployment system is configured to use air to lower the axle to deploy the axle, wherein the axle deployment system comprises an air booster and a pivotable arm attached to the axle and to the air booster, wherein the air booster pushes the pivotable arm to lower the axle, and wherein the axle deployment system comprises a steel cable which is configured to raise the axle when the axle is to be withdrawn, wherein the lift axle system comprises two base plates, wherein an assembly module is positioned and coupled under each base plate, and a mount for a single air booster is coupled to a predefined attachment point on each assembly module, wherein the mount for the single air booster is installed halfway between the attachment point of the arm and the attachment point of the axle, wherein the mount for the single air booster also includes the assembly of a pulley, which is part of the steel cable path used in the process of raising the axle.

18. The lift axle system as recited in claim 17, wherein each single air booster is coupled to its mount, wherein the single air booster serves to push the arm downwards, wherein the single air booster is positioned from top to bottom so that the pressure it exerts pushes vertically, wherein operation of the single air booster is adjustable by adjusting the length of a threaded rod.

* * * * *